(12) United States Patent
Williamson

(10) Patent No.: US 9,644,662 B2
(45) Date of Patent: May 9, 2017

(54) COLD SPRAY NODES, STUDS, STUD ASSEMBLIES, AND METHODS OF MANUFACTURE

(71) Applicant: GOODRICH CORPORATION, Charlotte, NC (US)

(72) Inventor: J. Keith Williamson, Fairview Park, OH (US)

(73) Assignee: Goodrich Corporation, Charlotte, NC (US)

( * ) Notice: Subject to any disclaimer, the term of this patent is extended or adjusted under 35 U.S.C. 154(b) by 469 days.

(21) Appl. No.: 14/218,490

(22) Filed: Mar. 18, 2014

(65) Prior Publication Data

US 2015/0267732 A1   Sep. 24, 2015

(51) Int. Cl.
| | | |
|---|---|---|
| B05D 1/12 | (2006.01) | |
| C23C 24/04 | (2006.01) | |
| F16B 33/00 | (2006.01) | |
| F16B 37/00 | (2006.01) | |
| B23P 25/00 | (2006.01) | |
| F16B 35/00 | (2006.01) | |
| F16B 37/04 | (2006.01) | |

(52) U.S. Cl.
CPC ............... *F16B 33/00* (2013.01); *B05D 1/12* (2013.01); *B23P 25/003* (2013.01); *C23C 24/04* (2013.01); *F16B 35/00* (2013.01); *F16B 37/00* (2013.01); *F16B 37/048* (2013.01); *Y10T 29/49885* (2015.01); *Y10T 29/49982* (2015.01); *Y10T 403/68* (2015.01)

(58) Field of Classification Search
CPC .... B05D 1/12; B05D 1/06; B05D 1/10; B23P 25/003; C23C 24/04
See application file for complete search history.

(56) References Cited

U.S. PATENT DOCUMENTS

| | | | |
|---|---|---|---|
| 5,760,338 A | 6/1998 | Suzuki | |
| 8,601,663 B2 * | 12/2013 | Ngo | B23P 6/00 29/402.18 |
| 2006/0134320 A1 * | 6/2006 | DeBiccari | B23P 6/007 427/140 |
| 2008/0258339 A1 * | 10/2008 | Conrad | B44F 7/00 264/293 |
| 2015/0321217 A1 * | 11/2015 | Nardi | C23C 24/04 427/180 |

FOREIGN PATENT DOCUMENTS

| | | | |
|---|---|---|---|
| EP | 0599662 | 6/1994 | |
| EP | 1413642 | 4/2004 | |
| EP | 2626166 | 8/2013 | |
| FR | 2996475 A1 * | 4/2014 | ............. C23C 24/04 |

OTHER PUBLICATIONS

Extended European Search Report dated Jul. 22, 2015 in European Application No. 15157841.6.

\* cited by examiner

*Primary Examiner* — Teresa M Ekiert

(74) *Attorney, Agent, or Firm* — Snell & Wilmer L.L.P.

(57) ABSTRACT

Studs, nodes, and study assembly systems formed by various methods are disclosed. Various disclosed methods include cold spraying a powder onto a substrate to form a node on the substrate and drilling a hole only into the node. Various disclosed methods include cold spraying a powder onto a substrate to form a node and machining the node to form a stud.

11 Claims, 9 Drawing Sheets

COLD SPRAY NODES, STUDS, STUD ASSEMBLIES, AND METHODS OF MANUFACTURE

FIELD

The present disclosure relates to cold spray nodes, studs, stud assemblies and methods of manufacture of cold spray nodes, studs, and stud assemblies.

BACKGROUND

Studs are often used as an anchor point to hold wire and/or hydraulic harnesses in place on aircraft, such as on a landing gear structure. Conventional studs typically may be adhered to various structural components of an aircraft with various adhesives that bond the stud to structural components. Some conventional studs using adhesives however, do not have sufficient bonding strength under load when used with coated structural components or when bonded to curved surfaces of structural components.

SUMMARY

Methods disclosed include cold spraying a powder onto a substrate to form a node on the substrate and drilling a hole only into the node. Stud nodes and stud assembly systems produced by methods that include cold spraying a powder onto a substrate to form a node on the substrate and drilling a hole only into the node are also disclosed.

Methods disclosed include cold spraying a powder onto a substrate to form a node and machining the node to form a stud. Studs produced by methods that include cold spraying a powder onto a substrate to form a node and machining the node to form a stud are also disclosed.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
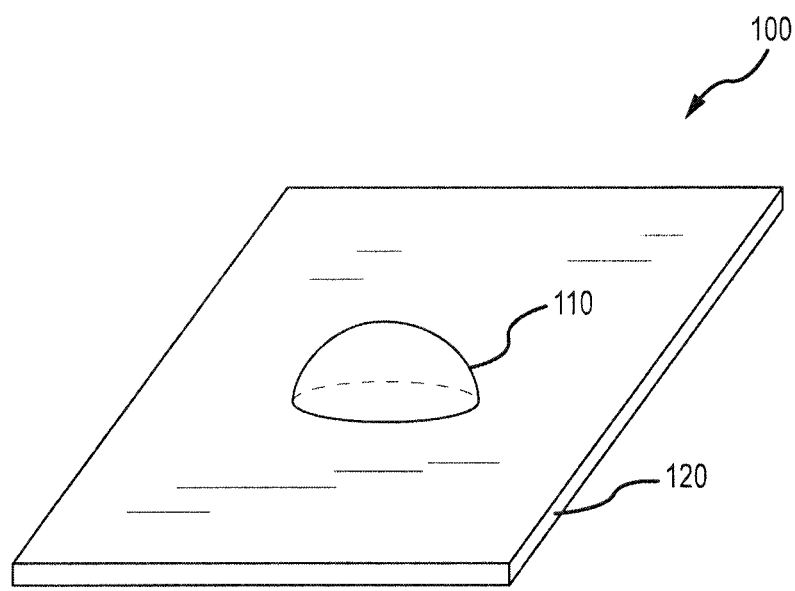
FIG. 1 illustrates a substrate-node assembly made from a cold spray process, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, the term "cold spray" may include any gas dynamic cold spray, which may include deposition methods where solid powders are accelerated in gas jets to adhere to the surface of a substrate. In various methods of cold spraying, the particles of the powders may be accelerated in supersonic gas jets that expel a working gas and may achieve velocities between about 1,476 ft/s (about 450 m/s) to about 3,281 ft/s (about 1,000 m/s). When the particles impact the substrate, the particles may undergo plastic deformation and adhere to the surface of the substrate. Thus, unlike thermal spraying techniques, the particles may not be melted during the cold spray process. In various methods of cold spraying, a spray nozzle may be used to form shapes having a substantially uniform thickness.

According to various embodiments, the cold spray process may be either a high pressure cold spray ("HPCS"), a low pressure cold spray ("LPCS"), or a combination thereof. In various embodiments, HPCS may use a working gas at pressures above about 217.6 psi (about 1.5 MPa) and may have a working gas flow rate above about 70.6 ft$^3$/min (about 2 m$^3$/min). In various embodiments, a LPCS may comprise a working gas having a pressure between about 72.5 psi (about 0.5 MPa) to about 145 psi (about 1 MPa) and may have flow rate between about 17.7 ft$^3$/min (about 0.5 m$^3$/min) to about 70.6 ft$^3$/min (about 2 m$^3$/min). According to various embodiments, the stand-off distance (i.e., the distance between the substrate and the cold spray nozzle) is not particularly limited and may, according to various embodiments, range from about 0.02 inches (about 5 mm) to about 7.5 inches (about 19 cm), from about 3 inches (about 7.6 cm) to about 6.5 inches (about 16.5 cm), and about 4 inches (about 10 cm) to about 6 inches (about 15 cm).

Without being limited to any theory it is believed that when the powder particles are sprayed using the cold spray process, adiabatic shear instability may occur at the particle substrate interface at or beyond a "deposition velocity," When a particle traveling at the "deposition velocity" impacts the substrate, a shear load may be generated, which may accelerate the powder particles laterally causing adiabatic shear instability. It is believed, without being limited to any theory, that the adiabatic shear instability may permit bonding of the powder particles to the substrate and other deposited powder particles. Furthermore, it is also believed that the additional compressive layers from the cold spray process may impart additional compressive layers onto the substrate and may improve the life of the substrate when used as a component, for example, in an aircraft.

As used herein, the term "powders" and "powder particles" may be used interchangeably and may include any particles capable of being used in any known or hereinafter developed cold spray process. Such powders may include powder particles comprising stainless steel, aluminum, titanium, copper, tantalum, nickel, tungsten, and alloys thereof. Thus, according to various embodiments, cold spraying may be used to deposit various powders onto a substrate to form a node.

As used herein, the term substrate may include any substrate compatible with any cold spray process. Exemplary substrates may comprise aluminum, steel, titanium, tungsten, nickel, cobalt, chromium, molybdenum, and alloys thereof. For example, according to various embodiments, the substrate may comprise various steel alloys, such as high strength low alloy steel ("HSLA") that is commercially known as 300M, or may comprise high strength steel, such as Aermet® 100, a registered trademark of the Carpenter Technology Corporation, and may comprise titanium alloys, such as Ti 6Al-4V, commercially available from the Titanium Metal Corporation as Ti 6Al-4V ELI.

Figure 6:
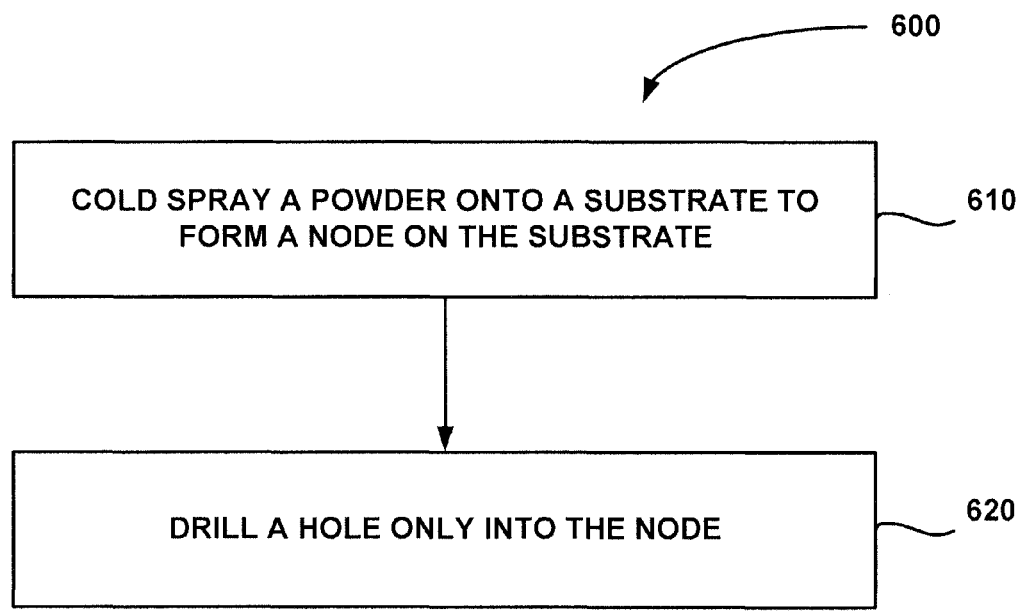
FIG. 6 illustrates a method of manufacture, in accordance with various embodiments.

With reference to FIG. 6, method 600 is illustrated. According to various embodiments, method 600 may comprise cold spraying a powder onto a substrate to form a node on the substrate (step 610). As previously discussed the cold spray process is not particularly limited. For example, in various embodiments, the cold spray process may comprise a HPCS process, may comprise a LPCS process, or a combination of a HPCS process and a LPCS process. In various embodiments, method 600 may comprise drilling a hole only into the node (step 620). According to various embodiments, step 620 may also comprise tapping the drilled hole. In various embodiments, the hole may be tapped while the hole is being drilled and in various embodiments, the hole may be tapped after the hole is being drilled.

With reference to FIG. 1, FIG. 1 illustrates a substrate-node assembly 100 comprising node 110 deposited on substrate 120, according to various embodiments. Although FIG. 1 illustrates node 110 deposited on a planar surface of substrate 120, the particular geometric shape of the substrate is not particularly limited. Accordingly, in various embodiments, the cold spray process may be used on curved and/or angled surfaces of a substrate.

Figure 2:
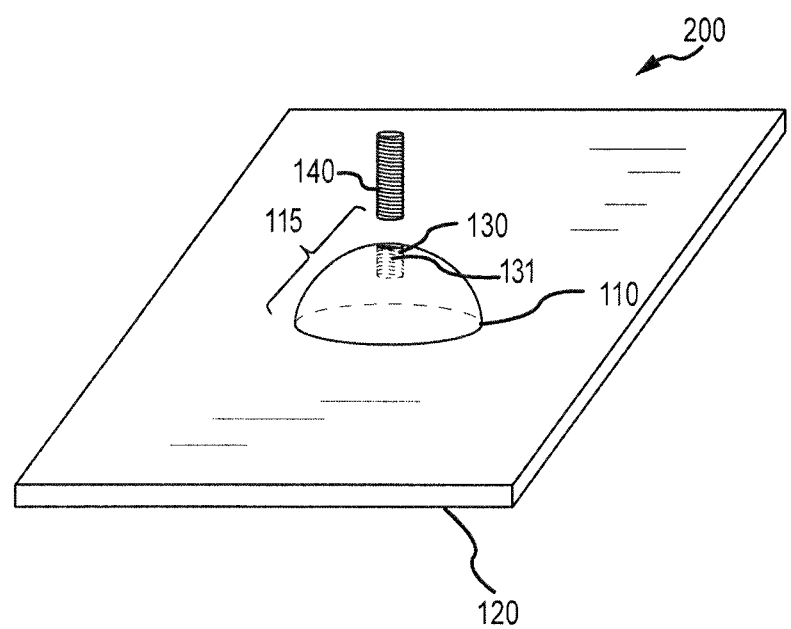
FIG. 2 illustrates a stud assembly, in accordance with various embodiments.

With reference to FIG. 2, stud assembly 200 is shown. Stud assembly 200 may comprise a stud 140 and a stud receptacle 115, which may comprise a hole 130 drilled into node 110 deposited on substrate 120. In various embodiments, hole 130 may also be tapped to create mating threads 131 to receive a threaded stud, as exemplified with stud 140.

Figure 7:
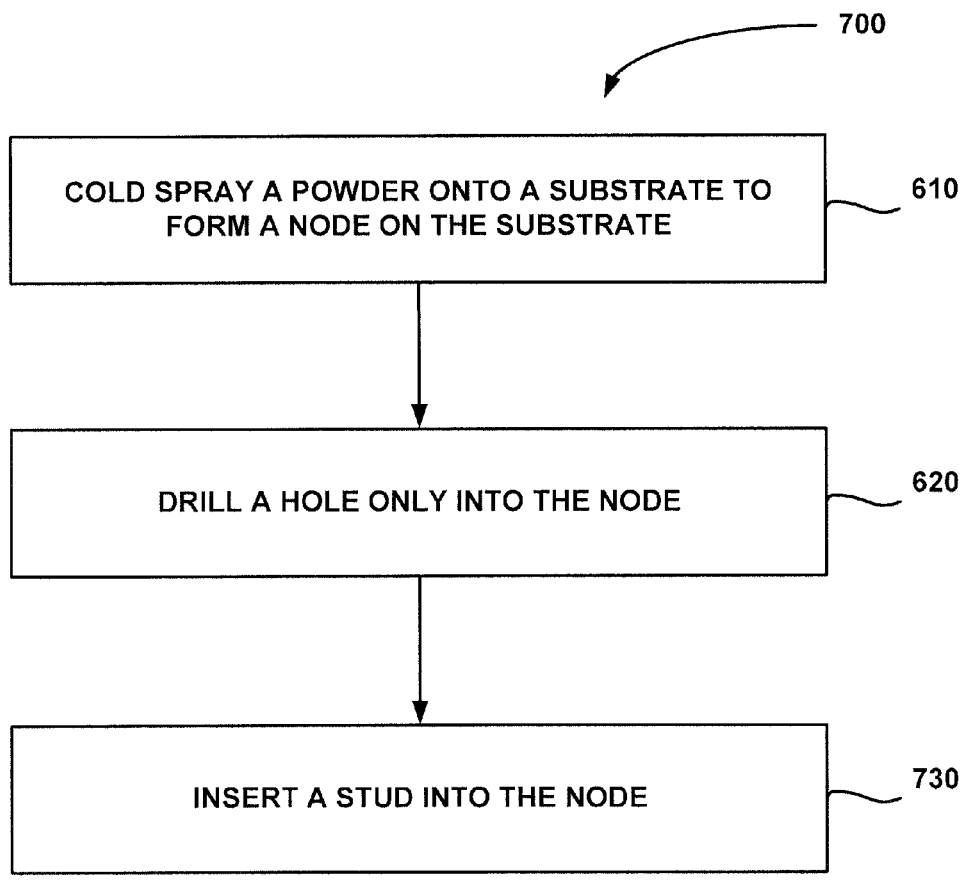
FIG. 7 illustrates a method of manufacture, in accordance with various embodiments.

With reference to FIG. 7, FIG. 7 illustrates a method 700 for manufacturing a stud assembly. Similar to method 600, method 700 may comprise cold spraying a powder onto a substrate to form a node on the substrate (step 610) and drilling a hole only into the node (step 620). According to various embodiments, method 700 may also comprise inserting a stud into the hole (step 730).

Figure 3:
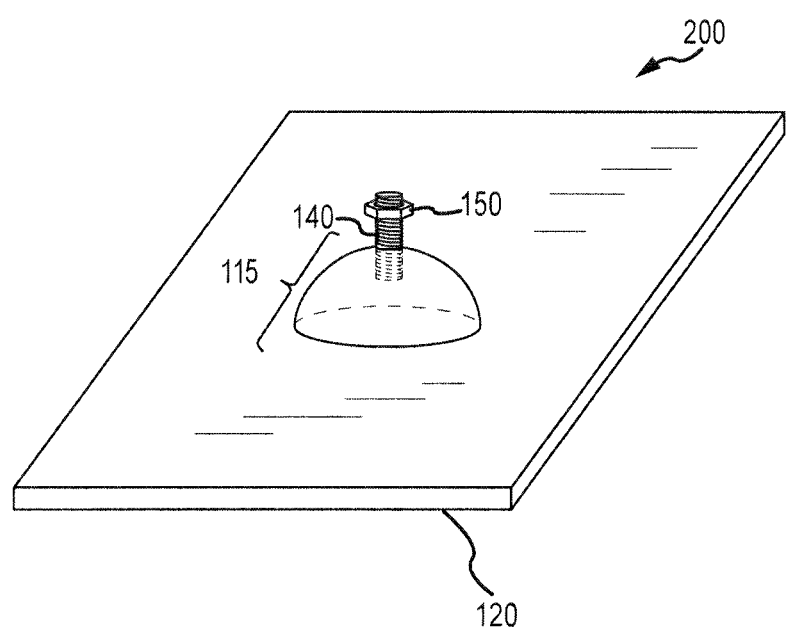
FIG. 3 illustrates a stud assembly in connection with a harness attach point, in accordance with various embodiments.

For example, with reference to FIG. 3, FIG. 3 illustrates stud assembly 200 where stud 140 is inserted into hole 130 drilled into node 110. As exemplified in FIG. 3, stud 140 may be a threaded stud that may be threaded into hole 130, which may be tapped with mating threads 131 according to various embodiments, of stud receptacle 115. Moreover, in various embodiments a harness or wire (not shown) may be attached to the stud assembly 200 with harness attach point 150. According to various embodiments, attach point 150 may comprise female threads (not shown) configured to engage the threads of stud 140.

Figure 4:
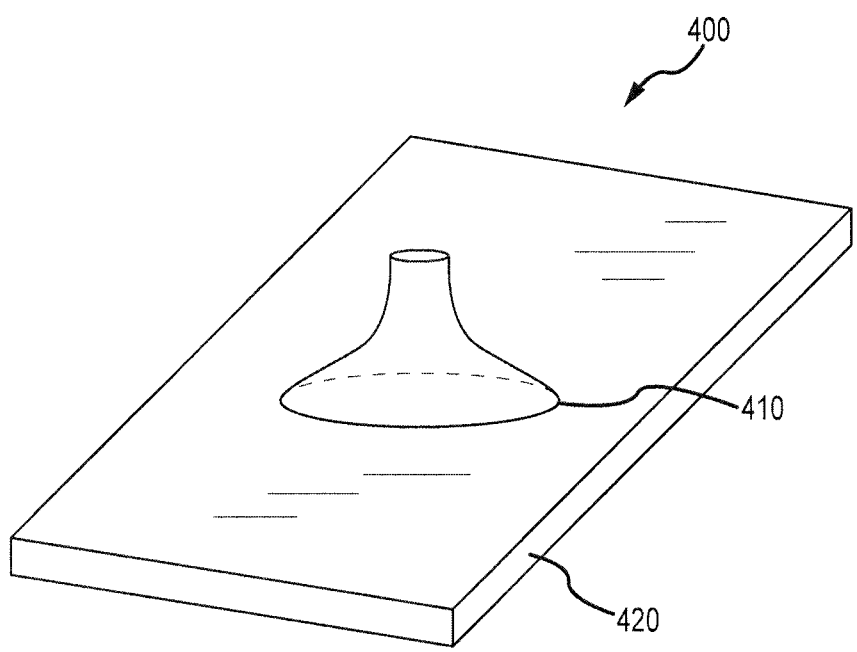
FIG. 4 illustrates a substrate-node assembly made from a cold spray process, in accordance with various embodiments.
Figure 5:
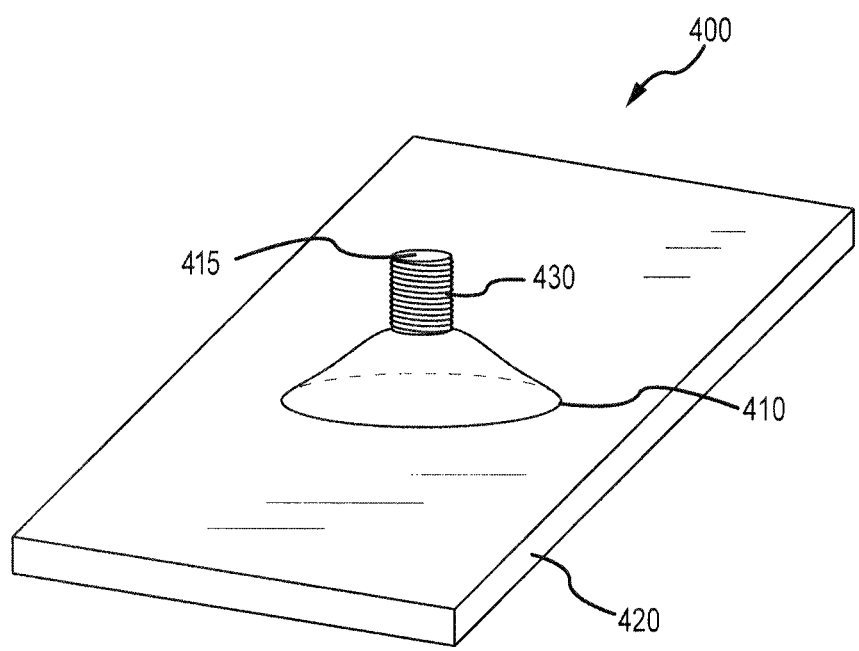
FIG. 5 illustrates a stud assembly, in accordance with various embodiments.
Figure 8:
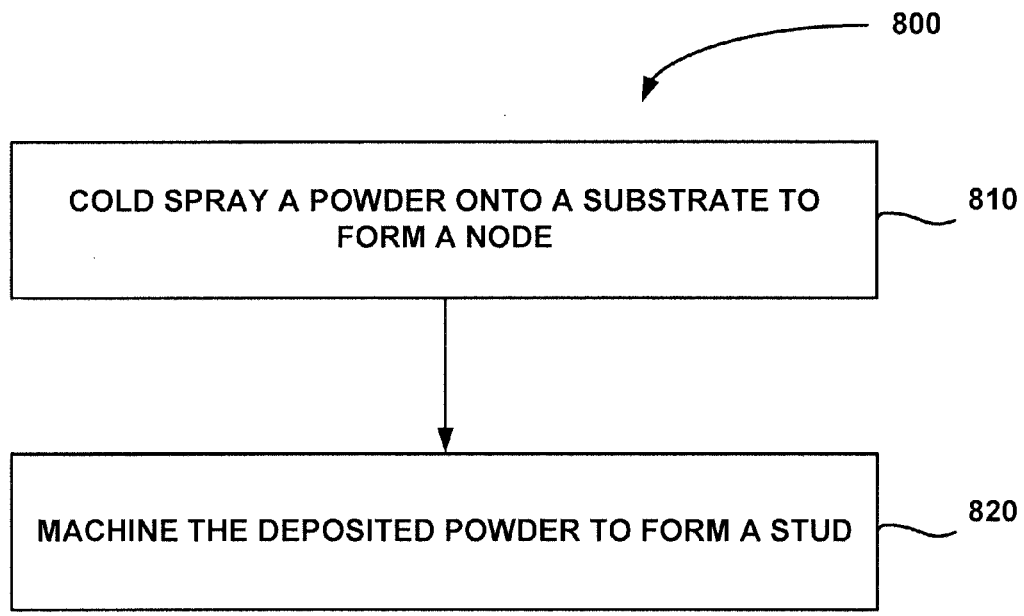
FIG. 8 illustrates a method of manufacture, in accordance with various embodiments.

With reference to FIGS. 4 and 8, FIG. 8 illustrates a method for manufacturing a stud according to various embodiments and FIG. 4 illustrates a node according to various embodiments. According to various embodiments, method 800 illustrated in FIG. 8 comprises cold spraying a powder onto a substrate to form a node on the substrate (step 810) and then machining the node to form a stud (step 820), for example, as stud 415 illustrated in FIG. 5. FIG. 4 illustrates substrate-node assembly 400 where node 410 is formed on substrate 420 according to various embodiments. FIG. 5 illustrates an exemplary stud according to various embodiments, where node 410 has been machined to form stud 415. According to various embodiments, threads 430 may be formed (e.g., machined) on stud 415.

According to various embodiments, nodes, stud assemblies, and studs formed by the various methods disclosed herein may have higher adhesion strengths than some conventional methods. For example, some conventional adhesives may have adhesion strengths between about 5,000 psi (about 34 MPa) to about 10,000 psi (about 68.9 MPa), whereas various nodes, studs, and stud assemblies according to the various disclosed embodiments may have adhesion strengths between about 25,000 psi (about 172 MPa) and about 30,000 psi (about 206 MPa), wherein the term "about" in this context only means +/−500 psi. As used herein, the term "adhesion strength" may include the tensile strength required to separate two bonded surfaces.

Figure 9:
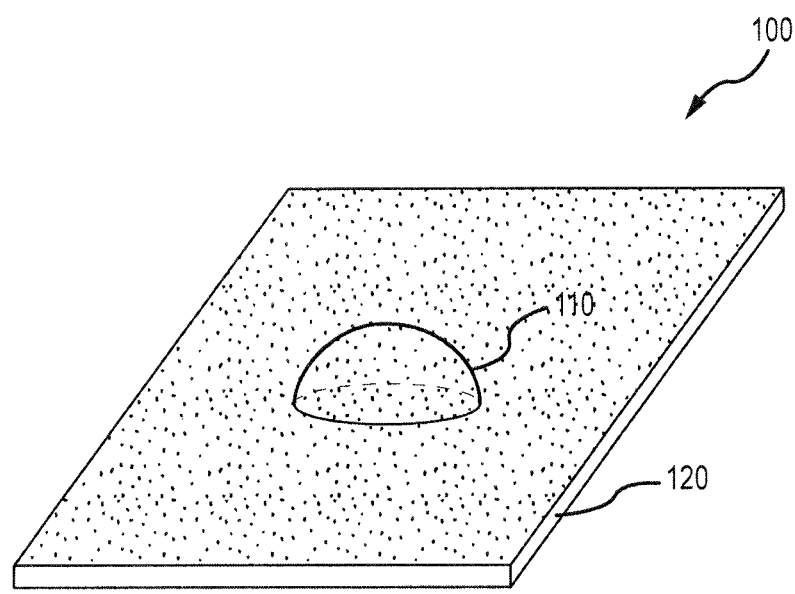
FIG. 9 illustrates a plated substrate-node assembly.

Moreover, unlike some conventional methods using adhesives that cannot be plated (e.g., cadmium plated), various methods, nodes and studs disclosed herein may be plated along with the substrate. For example, with temporary reference to FIG. 9, substrate-node assembly 100 may be plated (e.g., cadmium plated), for example, prior to drilling hole 130 to form stud receptacle 115, as exemplified in FIG. 2. Without being limited to any theory, according to various embodiments, it is believed that plating after cold spraying the node deposited onto the substrate may improve bonding strength of the node or stud with the substrate. Moreover, according to various embodiments, it is believed that plating a bonded node or a bonded stud may improve overall bond strength to a substrate.

Additionally, disclosed methods according to various embodiments may permit the placement of nodes, studs, and stud assemblies on curved surfaces with sufficient bonding strength to support wires and harnesses under load (e.g., on an aircraft).

According to various embodiments, by drilling only the node, the integrity of the substrate may be preserved (e.g., a substrate created with a shocking process). For example, in some aircraft, substrate properties may be adversely affected if fractured or if drilled into. However, according to various embodiments, the addition of a node or stud with cold spray processes has been found to preserve some properties of the substrate. Accordingly, in various embodiments, the cold spray deposition of a node may allow for the placement of a stud by only drilling into the node and, thus, preserving the properties of the substrate.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   cold spraying a powder onto an outer surface of a substrate to form a node on the substrate, wherein the node extends above an exposed portion of the outer surface, the exposed portion being adjacent to the node;
   drilling a hole only into the node; and
   inserting a stud into the node.

2. The method according to claim 1, further comprising plating the node on the substrate.

3. The method according to claim 1, wherein the cold spraying the powder comprises cold spraying at least one of silicon carbide, stainless steel, aluminum, titanium, copper, tantalum, nickel, tungsten, and alloys thereof.

4. The method according to claim 1, wherein the cold spraying the powder comprises at least one of a high pressure cold spraying and a low pressure cold spraying.

5. The method according to claim 1, wherein the exposed portion of the outer surface is immediately adjacent to the node.

6. A method comprising:
   cold spraying a powder onto a substrate to form a node, wherein the node extends above an outer surface of the substrate; and
   machining the node to form a stud extending from the substrate; and
   forming threads on the stud.

7. The method of claim 6, wherein the cold spraying the powder comprises cold spraying at least one of silicon carbide, stainless steel, aluminum, titanium, copper, tantalum, nickel, tungsten, and alloys thereof.

8. The method according to claim 6, further comprising plating the node.

9. The method according to claim 6, wherein the cold spraying the powder comprises at least one of a high pressure cold spraying and a low pressure cold spraying.

10. A method comprising:
    cold spraying a powder onto an outer surface of a substrate to form a node on the substrate, wherein the node extends above an exposed portion of the outer surface, the exposed portion being adjacent to the node;
    drilling a hole only into the node; and
    tapping the drilled hole.

11. The method according to claim 10, further comprising threading a threaded stud into the tapped hole.

* * * * *